(12) United States Patent
Takeuchi

(10) Patent No.: US 7,282,828 B2
(45) Date of Patent: Oct. 16, 2007

(54) BRUSHLESS MOTOR STATOR, BRUSHLESS MOTOR HAVING SAME AND COIL STRUCTURE

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/424,339

(22) Filed: Jun. 15, 2006

(65) Prior Publication Data

US 2006/0220491 A1    Oct. 5, 2006

Related U.S. Application Data

(62) Division of application No. 10/531,926, filed as application No. PCT/JP2003/014668 on Nov. 18, 2003.

(30) Foreign Application Priority Data

Nov. 18, 2002    (JP)    ............................. 2002-334159

(51) Int. Cl.
*H02K 17/00*    (2006.01)
(52) U.S. Cl. ........................ 310/208; 310/71
(58) Field of Classification Search ................. 310/71, 310/40 MM, 67 R, 68 R, 216–217
See application file for complete search history.

(56) References Cited

U.S. PATENT DOCUMENTS

| | | |
|---|---|---|
| 3,796,039 A | 3/1974 | Lucien |
| 4,961,017 A | 10/1990 | Kakinoki et al. |
| 5,646,464 A | 7/1997 | Sickafus |
| 5,710,466 A | 1/1998 | Allen et al. |
| 5,760,521 A * | 6/1998 | Ushiro ...................... 310/268 |
| 2002/0145500 A1 | 10/2002 | Razzell et al. |

FOREIGN PATENT DOCUMENTS

| | | |
|---|---|---|
| JP | 58-115854 | 8/1983 |
| JP | 59-155902 | 9/1984 |
| JP | 61-269632 | 11/1986 |
| JP | 07-143696 | 6/1995 |
| JP | 8-154352 | 6/1996 |
| JP | 08-154352 A * | 6/1996 |
| JP | 2002-084720 | 3/2002 |
| JP | 2002-112524 | 4/2002 |
| JP | 2002-258229 | 9/2002 |
| WO | WO 01/43262 | 6/2001 |

OTHER PUBLICATIONS

Communication (w/translation) from Japanese Patent Office re: related application.
Supplementary Partial European Search Report mailed Aug. 17, 2006.

* cited by examiner

*Primary Examiner*—Thanh Lam
(74) *Attorney, Agent, or Firm*—Harness, Dickey & Pierce, P.L.C.

(57) ABSTRACT

A brushless motor stator comprising a lamination body in which conductive layers and insulating layers are formed alternately. A plurality of sets of coils of wound conductive patterns are formed on each conductive layer and the coils of the conductive layers adjoined via the insulating layers are connected to each other via through holes formed on the insulating layers.

4 Claims, 13 Drawing Sheets

(A)

(B)

(A)

(B)

(A)

(B)

(A)

(B)

(A)

(B)

BRUSHLESS MOTOR STATOR, BRUSHLESS MOTOR HAVING SAME AND COIL STRUCTURE

CROSS-REFERENCE TO RELATED APPLICATIONS

This application is a divisional of U.S. patent application Ser. No. 10/531,926 filed on Apr. 19, 2005 which is a 371 of PCT/JP2003/014668 filed Nov. 18, 2003 which claims the benefit of Japanese Patent Application No. 2002-334159 filed Nov. 18, 2002. The disclosures of the above applications are incorporated herein by reference.

FIELD

The present invention relates to a brushless motor stator and a brushless motor, and more particularly to a brushless motor using a stator having a structure in which a coil comprising a wound conductive pattern is formed on an insulating substrate and in which a plurality of said substrates are laminated.

BACKGROUND

The linear motor mobile coil as described in Japanese Patent Application Laid-open No. 2002-112524 is cited as an example of prior art related to the present invention. The object of this mobile coil is to enhance the heat radiation effect of the linear motor mobile coil. This mobile coil is comprised of 4 multilayered substrates, wherein a plurality of coils made of spiral conductor patterns are formed in alignment on each layer. The coils of each layer are electrically connected to each other by means of through holes via an insulating layer.

In the above mobile coils, compared to conventional mobile coils in which wires were lap wound, the heat radiation effect can be enhanced by increasing the heat radiation area of the conductor pattern through which the electrical current flows. Also, since the allowable current density of the conductor pattern can be increased by enhancing the heat radiation effect, the amount of copper used for the mobile coil in order to obtain the desired motor output can be reduced. This enables a lighter mobile coil and improved motor efficiency.

However, the above-mentioned precedent technology results in the following problems. Firstly, since the coil comprising 4 multilayer substrates, wherein a plurality of coils made of spiral conductive patterns are formed in alignment on each layer and wherein the coils of each layer are electrically connected to each other by means of through holes via an insulating layer is a mobile coil, the coil drive circuit cannot be formed on the multilayered substrate. This results in a complex structure. Secondly, although the heat radiation effect can be enhanced by increasing the heat radiation area of the conductor pattern, this heat radiation effect remains insufficient.

SUMMARY

In order to solve the above-mentioned problems, the object of the present invention is to provide: a brushless motor stator comprising a lamination body formed by alternate conductive layers and insulating layers; wherein a plurality of coils made of wound conductive patterns are formed on each conductive layer and wherein the coils of the conductive layers adjoined via the insulating layers are connected to each other via through holes formed in the same.

In the first aspect of the present invention, a drive circuit of the coil is provided in at least 1 of the conductive layers. The above conductive layer is formed on an insulating substrate which acts as the above insulating layer. Each winding of the coils of the adjoining conductive layers are connected to each other via the through holes. Furthermore, the present invention is a brushless motor comprising the above stator and a rotor comprising a permanent magnet.

In the present invention, the use of a multilayered substrate as a stator wherein a coil is formed on each layer enables the coil drive circuit to be integrated onto the substrate.

Furthermore, in a coil structure according to the present invention, in which a plurality of conductive layers and multiple insulating are alternately laminated; coils made of wound conductive patterns are formed on each conductive layer; and the coils of the adjoining conductive layers are electrically connected with each other via through holes formed in the insulating layers, a through hole as mentioned above is formed for each wind of the above conductive pattern of the above coil, which, via the above through hole, is electrically connected with each wind of the conductive pattern of the coil of the adjoining conductive layer. This structure enables a further enhancement in the heat radiation effect by means of the through hole.

DETAILED DESCRIPTION

Next, an embodiment of the coil stator of the brushless motor related to the present invention is described, where FIG. 1(A) is a plan view of the above and FIG. 1(B) is a side view of the same. The stator as a whole is comprised of an aggregate of circular substrates. Each substrate 1 is laminated in the direction defined by the rotational axis of the brushless motor as mentioned below.

10 is the through hole where the rotational axis is inserted. 3 roughly elliptical coil patterns 12 made of spirally or cyclically wound conductive patterns are evenly formed in a circumferential direction around the above through hole. The above substrate is, for example, composed of a print substrate, where a conductive pattern 1B is formed on the insulating layer 1A by means of a photo etching method.

The conductor on the substrate 1 is wound spirally as mentioned above to produce the above-mentioned coil pattern 12. These coil patterns 12 are connected to each other via the conductive layers of each substrate, where the coil patterns of certain layers are connected to the coil patterns of the adjoining conductive layers on either side in a layered direction of the substrate via the through holes 14A-C (refer to FIG. 2 and FIG. 3) formed on the insulating layer 1A.

Figure 2:
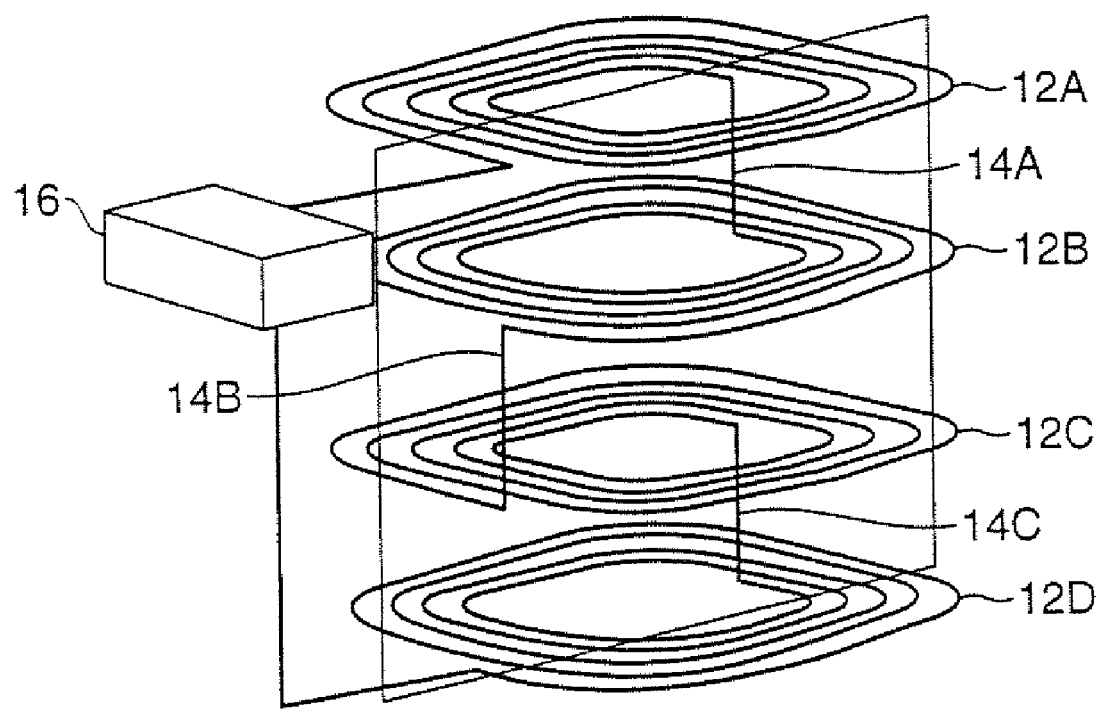
FIG. 2 is a diagram showing an example of a linkage of the conductive patterns of each conductive layer (coils)
Figure 3:
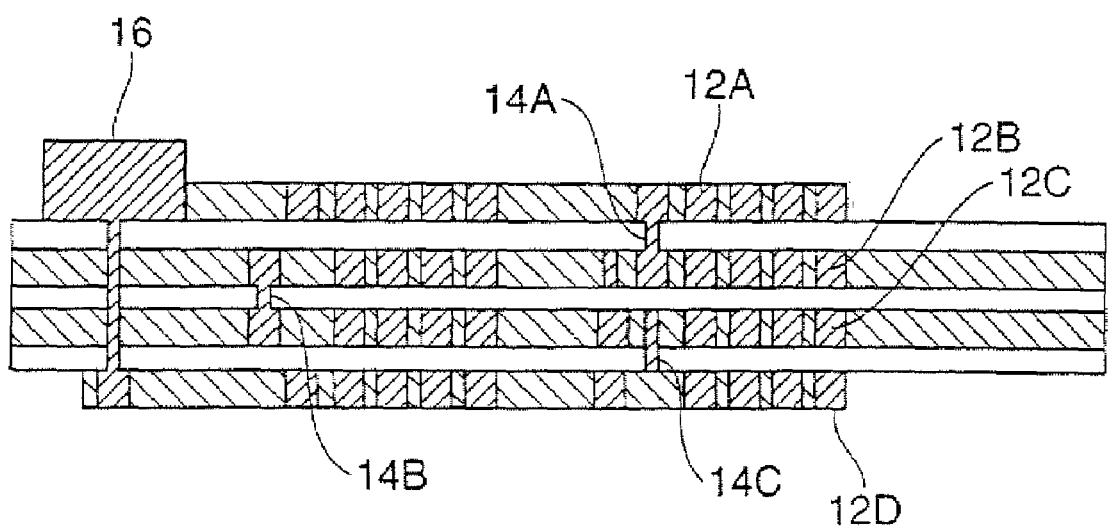
FIG. 3 is a side view describing the linkage structure of the conductive patterns of each conductive layer (coils)

FIG. 2 and FIG. 3 are conceptual diagrams showing coils of adjoining substrates which are connected to each other. The coil pattern 12A of the first substrate which is connected to the drive circuit 16 is connected to coil pattern 12B of the second substrate via the first through hole 14A formed on the first insulating layer of the first substrate. The coil pattern 12B is connected to coil pattern 12C of the third substrate via the second through hole 14B located on the insulating layer of the second substrate.

14C is the third through hole and 12D is the fourth coil pattern. These coil patterns 12A-12D are serially connected to the drive circuit 16. The drive circuit 16 can switch between 3 sets of coil patterns (12-1 to 12-3 in FIG. 1) which are formed over a plurality of substrates to supply an electrical current to the above coil patterns. In other words, the drive circuit 16 switches in sequence the sets of stator coils which provide the electrical current according to the magnetic pole position of the rotor comprising a permanent magnet. This drive circuit 16 is formed on the same layer as the conductive layer of the print substrate as shown in FIG. 1 and FIG. 3.

Figure 1:
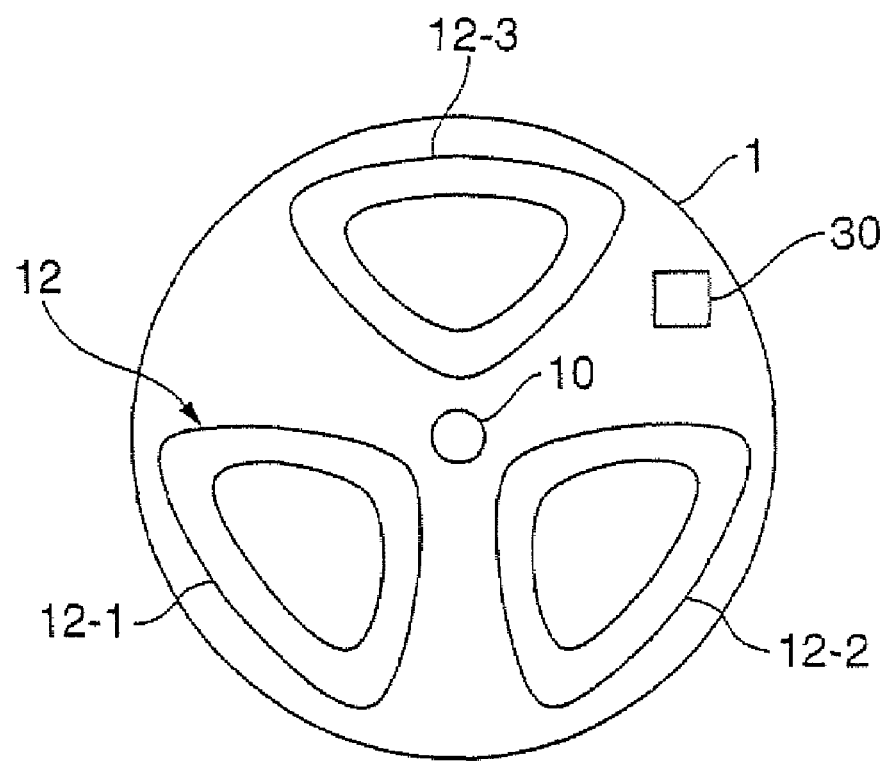
FIG. 1 is an overall schematic diagram of a stator related to the present invention, where (A) is a plan view of the above and (B) is a side view of the same.
Figure 1:
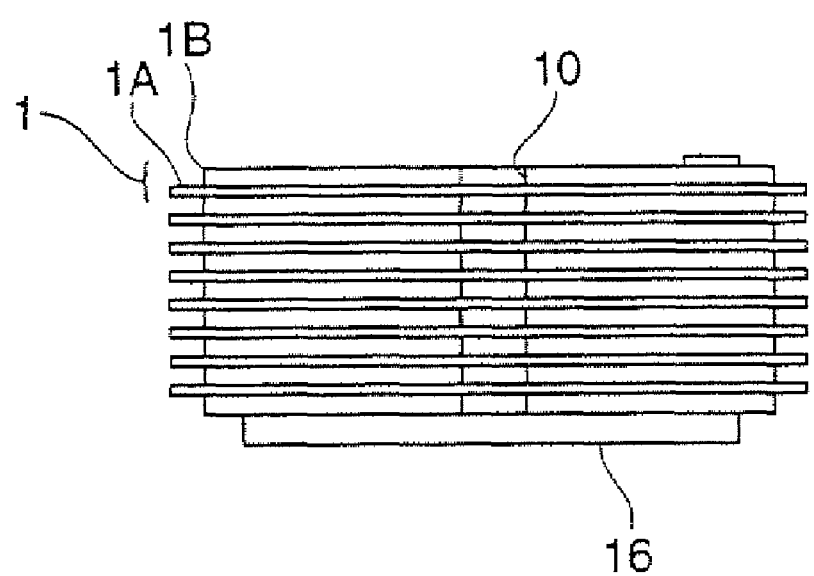

Furthermore, Symbol 30 of FIG. 1 corresponds to the magnetic sensor, which detects changes in the magnetic pole of the stator. This is then fed to the drive circuit. The drive circuit switches between the sets of stator coils which provide the electrical current according to the above-mentioned detected data. The magnetic sensor is not always necessary when switching the sets of stator coils which provide the electrical current by means of the drive circuit.

Figure 4:
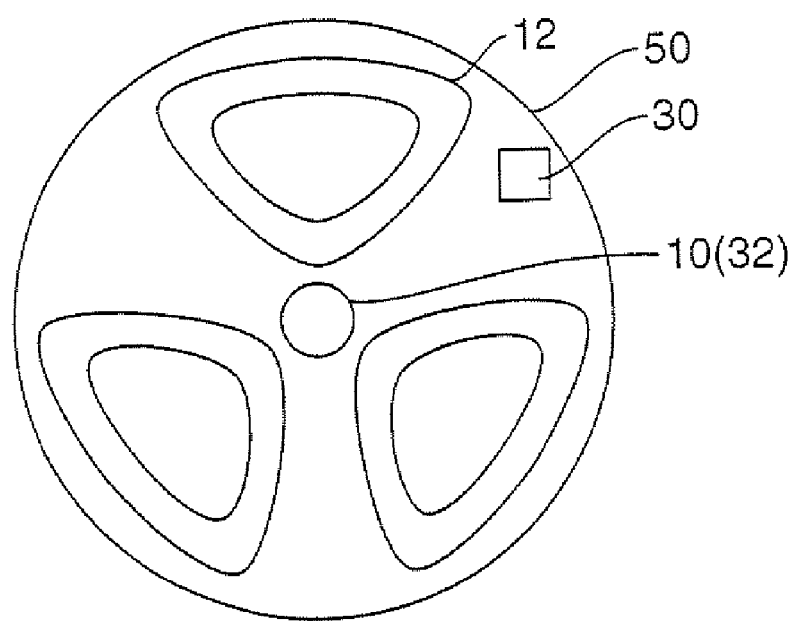
FIG. 4 is a diagram describing a brushless motor comprising the stator of FIG. 1, where (A) is a plan view of the above and (B) is a side view of the same.
Figure 4:
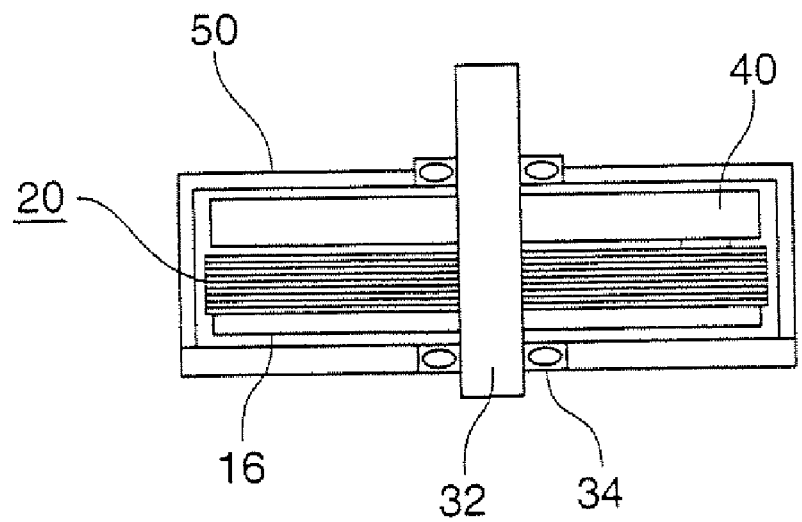

FIG. 4 is a type diagram of a brushless motor comprising the stator as shown in FIG. 1, where (A) is a plan view of the above and (B) is a type diagram of the same as viewed from the side. A rotational axis 32 is inserted through the above-mentioned through hole 10. The rotor 40 and the rotational axis 32 rotate as a single unit due to either the integration of the rotational axis 32 and the rotor 40 comprising a permanent magnet, or the press fitting of the rotational axis 32 onto the rotor 40. The rotational axis 32 is rotatably supported by the bearings 34 which is fitted to the case 50 of the motor.

Symbol 20 is a stator with multilayered substrates in which a plurality of substrates is laminated as shown in FIG. 1. The rotor 40 comprising a permanent magnet is located in a position along the direction of the rotational axis in relation to the above stator (same). According to the embodiment of FIG. 4, by using a substrate on which a coil pattern has been formed 20 as the stator, the drive circuit section 16 can be formed on the same layer as the conductive pattern of the substrate.

Figure 5:
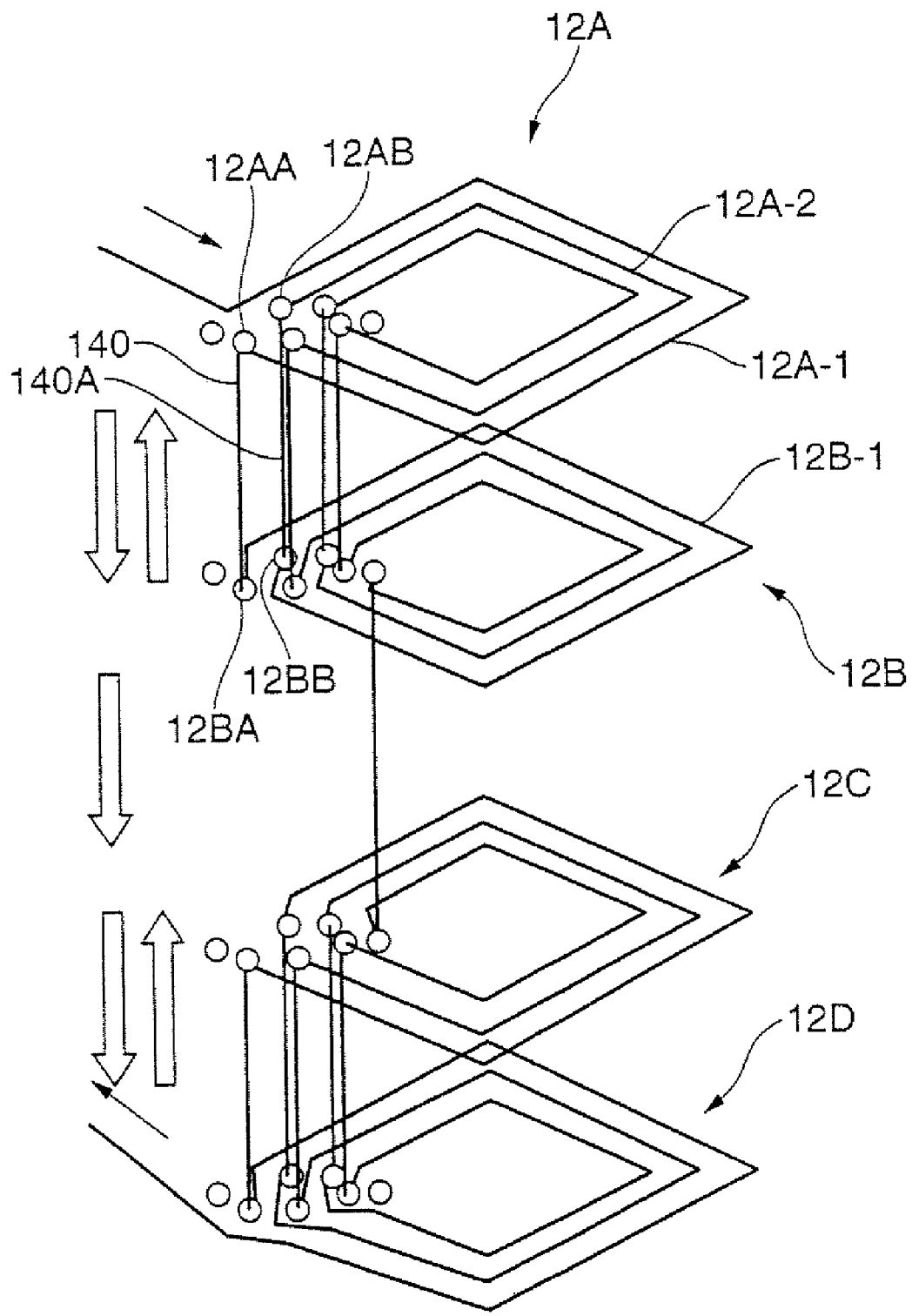
FIG. 5 is a type diagram showing a second example related to the formation of a coil pattern.

FIG. 5 is a type diagram showing another example of an aspect which forms a coil pattern. This aspect of FIG. 5 differs from those as previously described in that a through hole is provided for each wind of the coil pattern. In other words, a contact point 12AA is provided at the end of the first winding 12A-1 of coil pattern 12A, which is connected to the starting end 12BA of the first winding 12B-1 of coil pattern 12B of the second substrate via the through hole 140. The contact point 12BB at the end of the first winding 12B-1 of the coil pattern is connected to the starting end 12AB of the second winding 12A-2 of the coil pattern of the first substrate via the through hole 140A as a means of connectivity. By repeating this between adjoining patterns as illustrated below, each winding of the coil patterns of the substrates can be serially linked and connected to the drive circuit. According to the present embodiment, the increase in the number of through holes enables the sufficient release of heat generated by the coils via the increased number of through holes. The through holes are approximately 0.3 mm-1.5 mm in diameter, where the side walls of the holes are sheathed in conductive patterns. When an electrical current is sent to a stator coil via a through hole, the heat generated is released.

Figure 6:
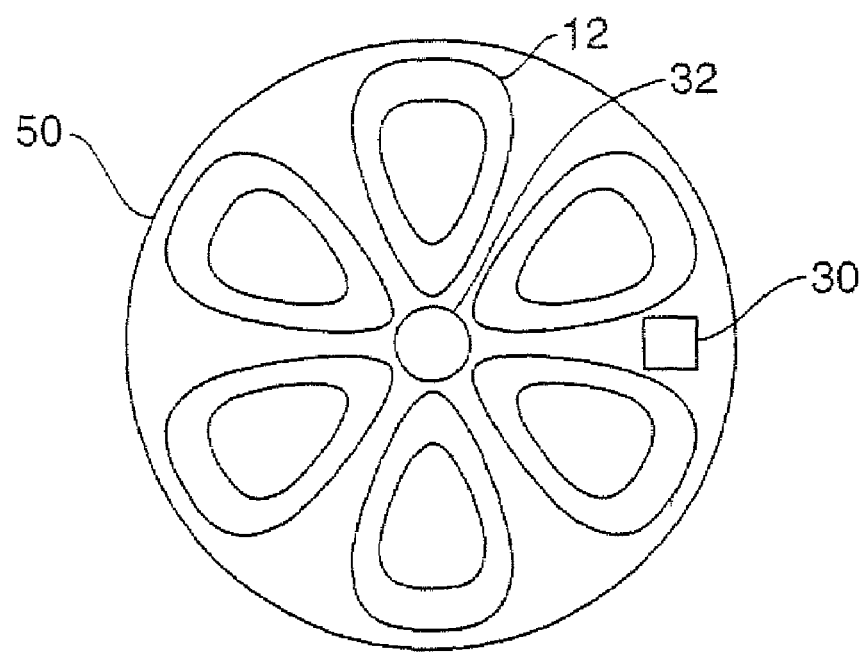
FIG. 6 is the second embodiment of the brushless motor, where the set of coils is increased compared to the brushless motor of FIG. 1, and where (A) is a plan view of the above and (B) is a side view of the same.
Figure 6:
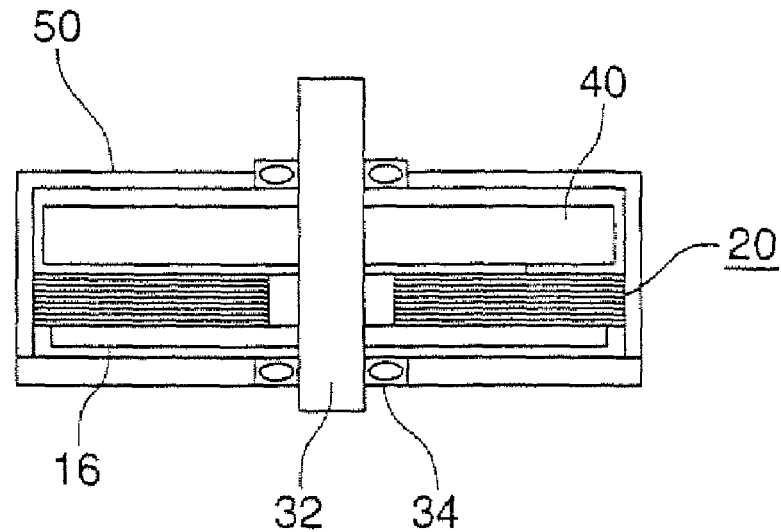

Next, as shown in FIG. 6, the above-mentioned brushless motor may be further multipolarized by increasing the number of coil 12 sets from 3 to 6 poles.

Figure 7:
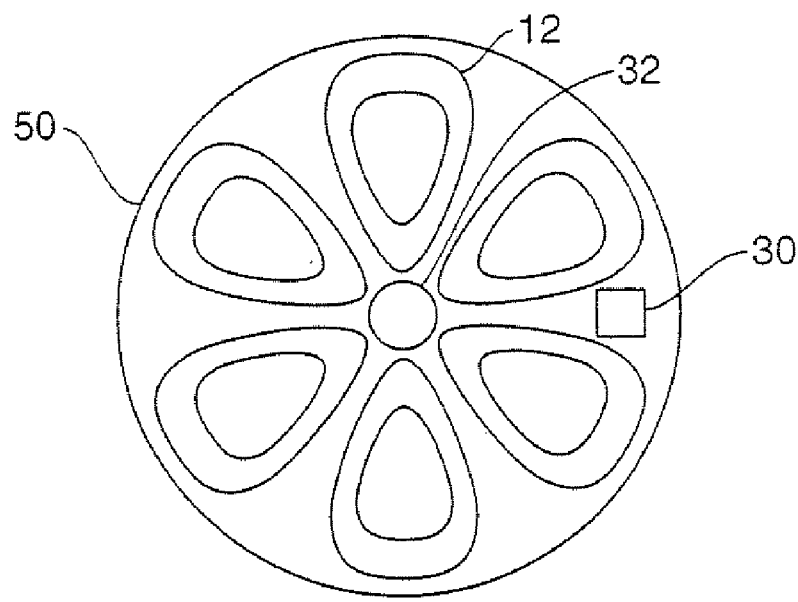
FIG. 7 is the third embodiment of the brushless motor, where a plurality of multilayered substrates on which coil patterns have been formed are laminated, and where (A) is a plan view of the above and (B) is a side view of the same.
Figure 7:
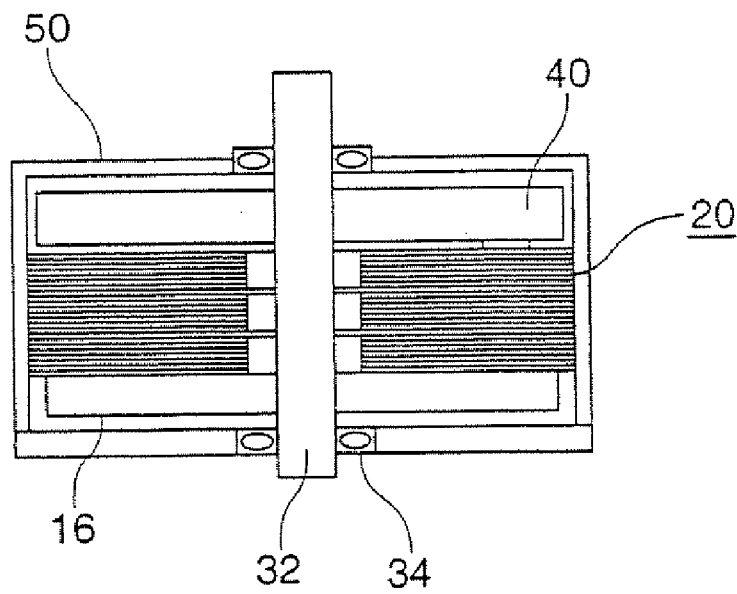
Figure 8:
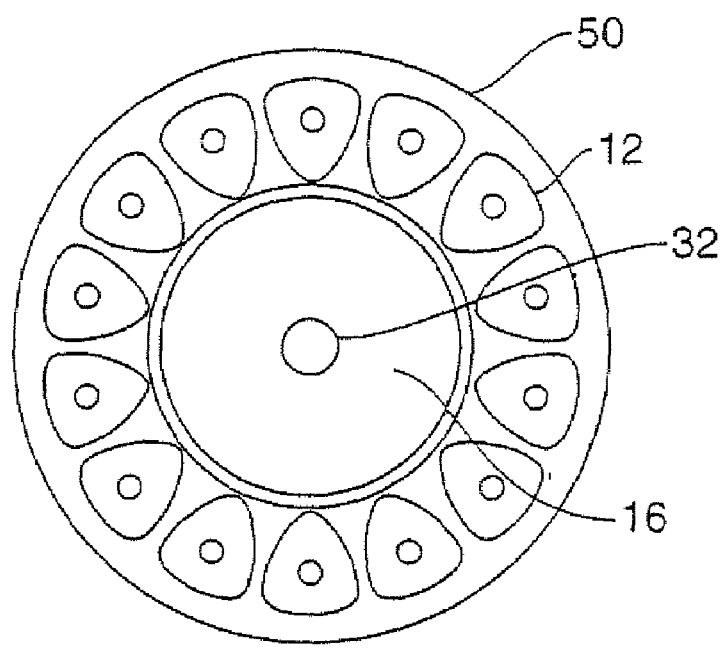
FIG. 8 is the fourth embodiment of the brushless motor, where a plurality of multilayered substrates on which the coil patterns have been formed are arranged evenly in a circumferential direction of the stator comprising a permanent magnet, and where (A) is a plan view of the above and (B) is a side view of the same.
Figure 8:
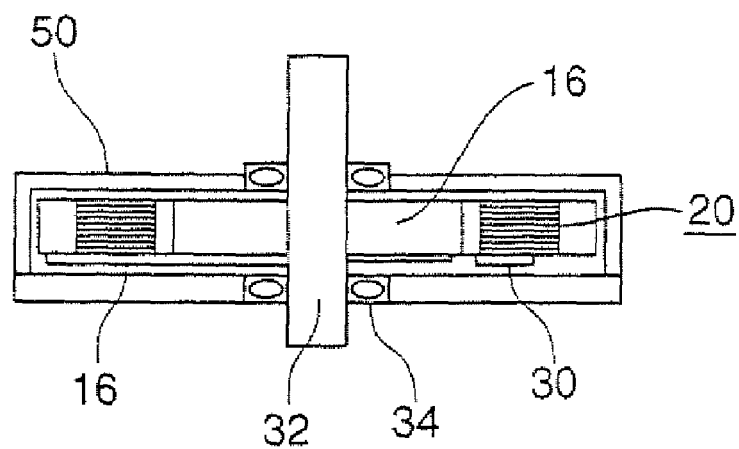

FIG. 7 shows the third embodiment of the brushless motor. This consists of a structure in which a plurality of sets of a multilayered substrate set (1 set) are laminated in the direction of rotational axis 32. FIG. 8 further relates to another embodiment, where multilayered substrates 20 are arranged next to each other around the circumference of the stator. A hole capable of accommodating a stator with a large diameter is formed at the center of the multilayered substrate. Sets of stator coils made to have an even greater multipolarity are evenly arranged in a circumferential direction on each multilayered substrate. According to this structure, the brushless motor can be made thinner compared to that of the above-mentioned embodiments.

Figure 9:
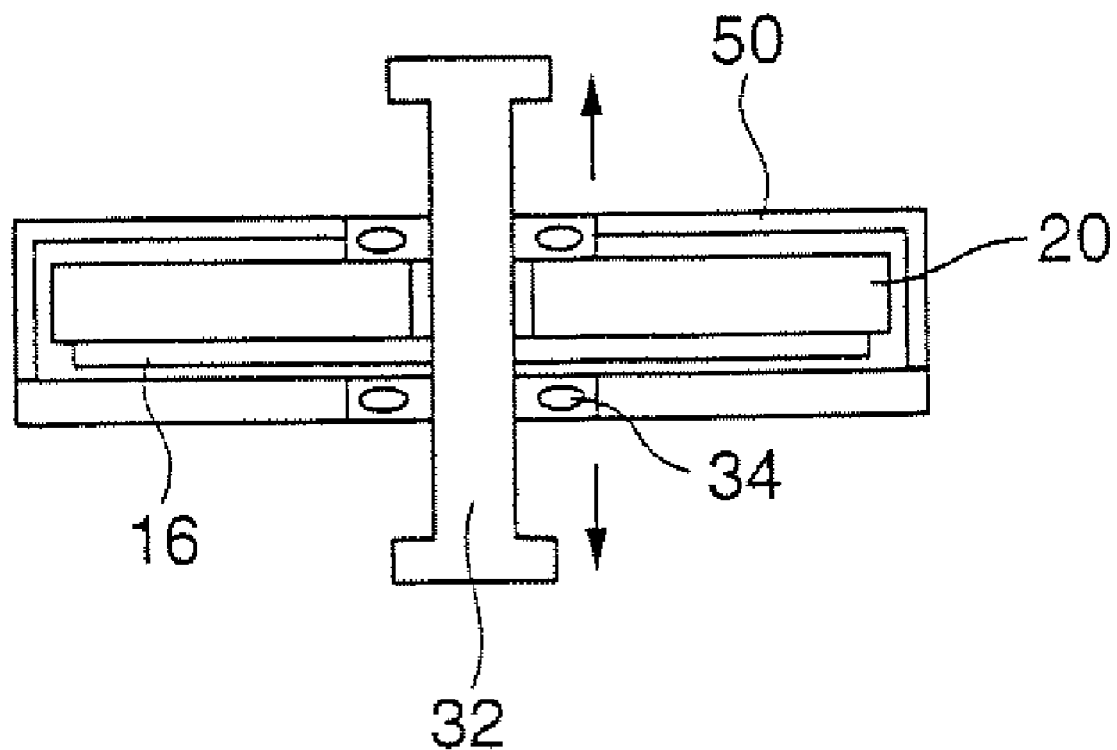
FIG. 9 shows a side view of an embodiment which applies the coil structure to a solenoid.

FIG. 9 shows a cross section related to an embodiment in which the coil structure described in the claims is applied to a solenoid. In this embodiment, the axis (plunger) 32 comprises a permanent magnet. The plunger can be moved backwards and forwards along the direction of the arrow by the drive signal supplied to the stator (multilayered substrate) 20. The case 50 of the motor comprises bearings 34 which enable the plunger to move in the above-mentioned direction. The plunger is supported by the case of the motor by means of the above bearings.

These bearings are placed in two locations facing each other in the direction of the thickness of the case, and support the axis 32 at two points. A known structure may be applied to the structure of the bearings. The magnetic bearing structure as put forward in patent application Ser. No. 2002-258229 may also be applied. In this bearing structure, the axis 32 is supported in a non-contact state based on a magnetic repulsion force which depends on a paired magnetic structure. This prevents any mechanical contact as in the bearing structure upon the generation of vibrations in the rotational axis.

Figure 10:
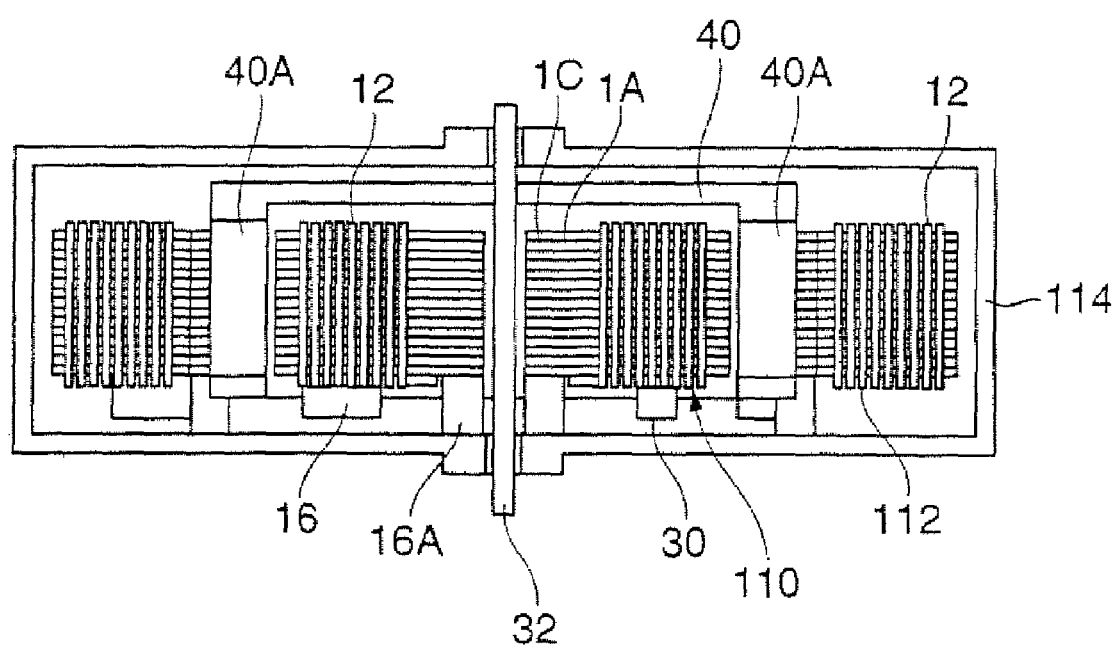
FIG. 10 is a detailed diagram of another motor structure.
Figure 11:
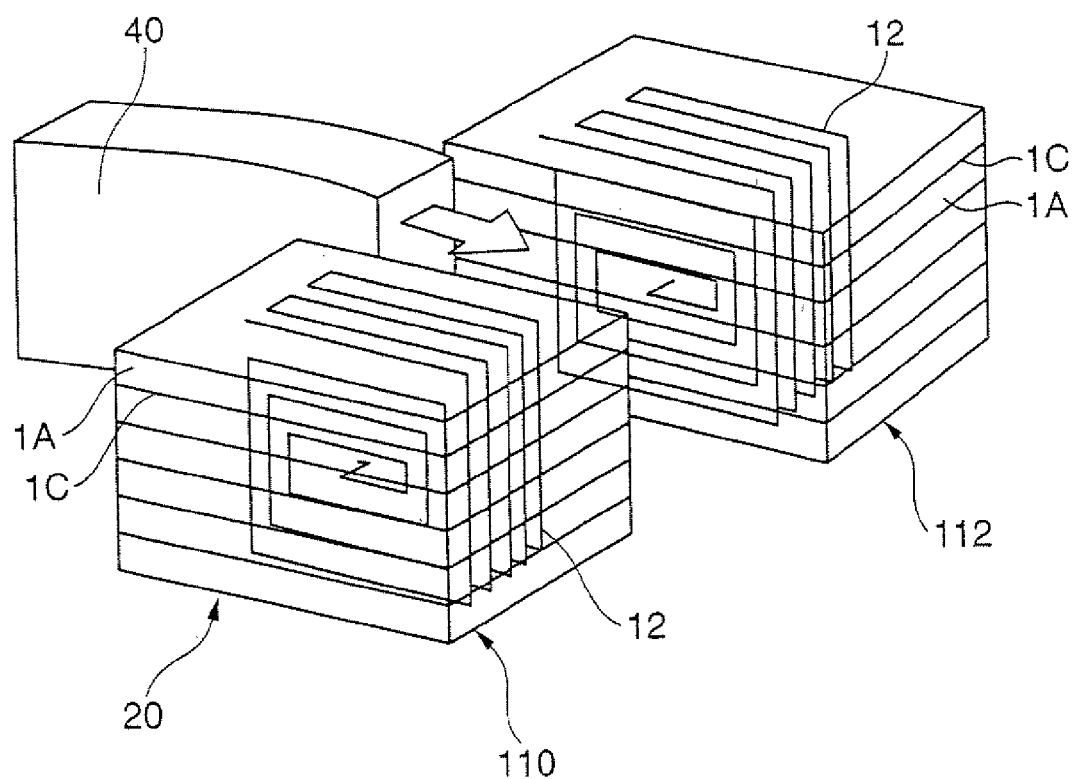
FIG. 11 is a partially enlarged diagram of the above.

Next, further embodiments of the present invention are described. FIG. 10 shows a motor which uses the above-mentioned coil structure. This motor has the following structure. Between an inner stator 110 and an outer stator 112, which are respectively formed in a ring shape, a rotor 40, which is also formed in a ring shape, rotates integrally with the axis 32 which is rotatably supported by the case 114. As shown in FIG. 11, the inner stator and the outer stator face each other across a gap, where the above-mentioned rotor 40 is rotatably positioned in the above-mentioned gap.

The above-mentioned coil patterns (coils) 12 formed evenly at a given pitch on the above-mentioned inner stator and outer stator along a circumferential direction. Permanent magnets are also arranged evenly at a given pitch on the rotor along a circumferential direction. A plurality of conductive films 1C is laminated on the inner stator or the outer stator via the insulating films 1A. A coil is made by forming a series of conductive patterns on a plurality of conductive films. The patterns are continuous between the plurality of conductive films via the through holes.

Figure 12:
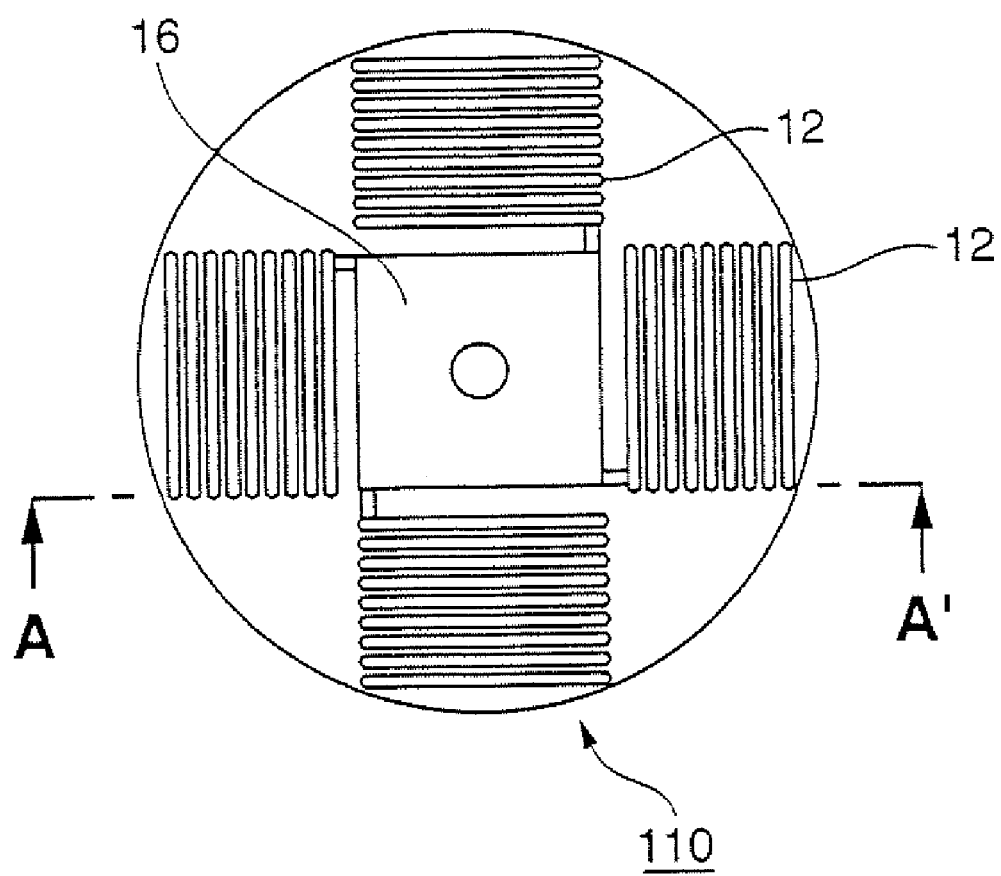
FIG. 12 is a plan view of the internal stator of said motor structure.
Figure 13:
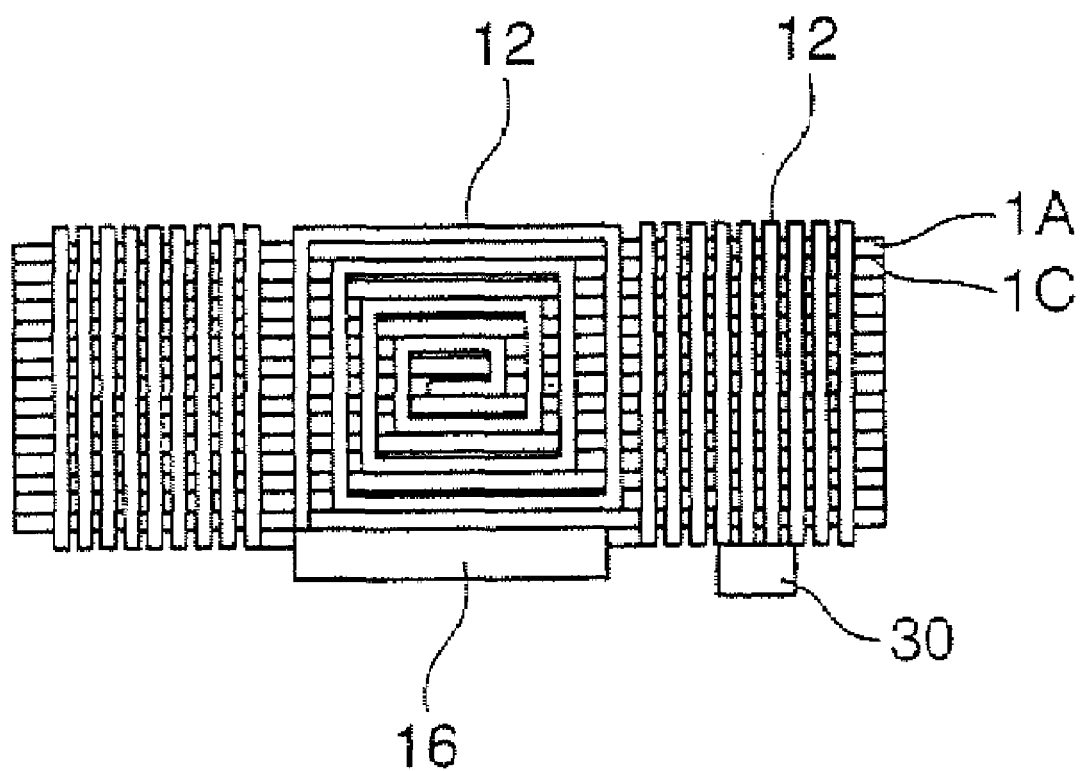
FIG. 13 is an end view in the direction of A-A' of said stator.

In this embodiment, the direction in which the coil patterns are formed differ from that of the above-mentioned embodiments. In other words, the coil patterns of the above-mentioned embodiments are formed along the plane of the conductive films, whereas, as shown in FIG. 12 and FIG. 13, the coil patterns of this embodiment are formed along the layered direction of a plurality of conductive films. Coil pattern 12 is spirally formed along the layered direction of the conductive films (refer to FIG. 13). This spiral-shaped coil pattern is formed over a plurality of layers along the radial direction of the stator (refer to FIG. 12). In the example of FIG. 12, each coil comprises 9 layers of spiral-shaped patterns. The patterns on each layer are linked on a conductive film.

I claim:

1. A motor comprising:
    a motor stator including a lamination body in which conductive layers and insulating layers are laminated alternately, and a plurality of sets of coils of conductive patterns are formed in the conductive layers in a spiral shape along a layered direction of the conductive layers, the coils of conductive patterns being connected to each other; and
    a rotor comprising a permanent magnet;
    wherein the stator includes an inner stator and an outer stator which are respectively formed in a ring shape, the rotor being positioned in a ring shaped gap provided between the stators, the rotor integrally rotating with a rotatably supported axis.

2. The motor according to claim 1 wherein the spiral-shaped coils of conductive patterns are formed over a plurality of layers along a radial direction of the stator.

3. A motor comprising:
    a motor stator including a lamination body in which conductive layers and insulating layers are laminated alternately, a plurality of sets of coils of conductive patterns being formed in the conductive layers, the coils of conductive patterns being connected to each other; and
    a rotor comprising a permanent magnet which rotates integrally with a rotatably supported axis, and which is surrounded by the sets of coils of conductive patterns;
    wherein the coils of conductive patterns are formed in a spiral shape along a layered direction of the conductive layers.

4. The motor according to claim 3 wherein the spiral-shaped coils of conductive patterns are formed over a plurality of layers along a radial direction of the stator.

* * * * *

UNITED STATES PATENT AND TRADEMARK OFFICE
CERTIFICATE OF CORRECTION

| | | |
|---|---|---|
| PATENT NO. | : 7,282,828 B2 | Page 1 of 1 |
| APPLICATION NO. | : 11/424339 | |
| DATED | : October 16, 2007 | |
| INVENTOR(S) | : Kesatoshi Takeuchi | |

It is certified that error appears in the above-identified patent and that said Letters Patent is hereby corrected as shown below:

TITLE PAGE: Related U.S. Application Data, (62), "Division of application No. 10/531,926, filed as application No. PCT/JP2003/014668 on Nov. 18, 2003." should be --Division of application No. 10/531,926 filed on April 19, 2005, which is a 371 of PCT/JP2003/014668 filed on Nov. 18, 2003.--

Column 5, Line 12: after "12" insert --are--

Signed and Sealed this

Twenty-ninth Day of April, 2008

JON W. DUDAS
*Director of the United States Patent and Trademark Office*